(12) United States Patent
Morrow et al.

(10) Patent No.: US 8,422,528 B2
(45) Date of Patent: Apr. 16, 2013

(54) CERAMIC SLAB, FREE-SPACE AND WAVEGUIDE LASERS

(75) Inventors: Clifford E. Morrow, North Kingstown, RI (US); Wendelin Weingartner, Brooklyn, NY (US)

(73) Assignee: Iradion Laser, Inc., North Smithfield, RI (US)

( * ) Notice: Subject to any disclaimer, the term of this patent is extended or adjusted under 35 U.S.C. 154(b) by 59 days.

(21) Appl. No.: 13/034,205

(22) Filed: Feb. 24, 2011

(65) Prior Publication Data
US 2012/0219028 A1 Aug. 30, 2012

(51) Int. Cl.
*H01S 3/03* (2006.01)

(52) U.S. Cl.
USPC .................. 372/64; 372/62; 372/57; 372/55; 372/36

(58) Field of Classification Search .................... 372/64, 372/62, 61, 57, 55, 36
See application file for complete search history.

(56) References Cited

U.S. PATENT DOCUMENTS

| | | | |
|---|---|---|---|
| 3,950,712 A | 4/1976 | Chenausky et al. | |
| 4,169,251 A | 9/1979 | Laakmann | |
| 4,373,202 A | 2/1983 | Laakmann et al. | |
| 4,393,506 A | 7/1983 | Laakmann et al. | |
| 4,455,658 A | 6/1984 | Sutter | |
| 4,493,087 A | 1/1985 | Laakman et al. | |
| 4,596,018 A * | 6/1986 | Gruber et al. | 372/87 |
| 4,719,639 A | 1/1988 | Tulip | |
| 4,720,691 A | 1/1988 | Rammos | |
| 4,805,182 A | 2/1989 | Laakmann | |
| 4,837,772 A | 6/1989 | Laakmann | |
| 4,939,738 A | 7/1990 | Opower | |
| 5,008,894 A | 4/1991 | Laakmann | |
| 5,048,048 A | 9/1991 | Nishimae et al. | |
| 5,065,405 A | 11/1991 | Laakmann et al. | |
| 5,155,739 A * | 10/1992 | Mefferd | 372/107 |
| 5,216,689 A | 6/1993 | Gardner et al. | |
| 5,220,577 A | 6/1993 | Opower | |

(Continued)

OTHER PUBLICATIONS

International Searching Authority, International Search Report and Written Opinion for PCT/US2012/025887, Jun. 20, 2012, pp. 1-10.

(Continued)

*Primary Examiner* — Kinam Park
(74) *Attorney, Agent, or Firm* — Barnes & Thornburg LLP

(57) ABSTRACT

A laser may comprise a ceramic body including a first wall and a second wall opposite the first wall, a first mirror positioned at first ends of the first and second walls, a second mirror positioned at second ends of the first and second walls opposite the first ends, the first and second walls and the first and second mirrors defining a slab laser cavity within the ceramic body. The laser may further comprise a first electrode positioned outside the laser cavity and adjacent to the first wall of the ceramic body and a second electrode positioned outside the laser cavity and adjacent to the second wall of the ceramic body, wherein a laser gas disposed in the laser cavity is excited when an excitation signal is applied to the first and second electrodes. In some embodiments, the first and second mirrors may form a free-space multi-folded resonator in the slab laser cavity. In other embodiments, the first and second mirrors may form a free-space unstable resonator in the slab laser cavity. In still other embodiments, the first and second mirrors may form a waveguide unstable resonator in the slab laser cavity.

34 Claims, 6 Drawing Sheets

U.S. PATENT DOCUMENTS

| | | |
|---|---|---|
| 5,386,431 A | 1/1995 | Tulip |
| 5,409,314 A | 4/1995 | Laakmann |
| 5,592,504 A * | 1/1997 | Cameron .................. 372/61 |
| 5,602,865 A | 2/1997 | Laakmann |
| 5,646,765 A | 7/1997 | Laakmann et al. |
| 5,661,746 A | 8/1997 | Sukhman et al. |
| 5,748,663 A * | 5/1998 | Chenausky .................. 372/64 |
| 5,754,575 A | 5/1998 | Sukhman et al. |
| 5,805,754 A | 9/1998 | Zhang |
| 5,822,354 A | 10/1998 | Vitruk |
| 5,881,087 A | 3/1999 | Sukhman et al. |
| 5,892,782 A | 4/1999 | Vitruk et al. |
| 5,953,360 A | 9/1999 | Vitruk et al. |
| 6,195,379 B1 | 2/2001 | Jones et al. |
| 6,198,758 B1 | 3/2001 | Broderick et al. |
| 6,198,759 B1 | 3/2001 | Broderick et al. |
| 6,599,034 B2 | 7/2003 | Tatoh et al. |
| 6,603,794 B2 | 8/2003 | Bethel et al. |
| 6,614,826 B1 | 9/2003 | Bethel et al. |
| 6,856,639 B2 | 2/2005 | Dutov et al. |
| 7,460,577 B2 | 12/2008 | Morrow |
| 7,480,323 B2 | 1/2009 | Murray |
| 7,570,683 B1 | 8/2009 | Broderick et al. |
| 2005/0057640 A1 | 3/2005 | Clarke et al. |
| 2005/0105581 A1 | 5/2005 | Seguin et al. |
| 2005/0175054 A1 | 8/2005 | Shackleton et al. |
| 2006/0029116 A1 | 2/2006 | Shackleton et al. |
| 2007/0041418 A1* | 2/2007 | Laughman et al. .............. 372/55 |
| 2008/0101430 A1* | 5/2008 | Morrow .................... 372/55 |
| 2008/0123707 A1 | 5/2008 | Murray |
| 2008/0124433 A1 | 5/2008 | Yelden et al. |
| 2008/0285607 A1 | 11/2008 | Murray |
| 2008/0285613 A1 | 11/2008 | Murray |

OTHER PUBLICATIONS

Synrad, Inc., Firestar V-Series CO2 Lasers Overview, 1 page, www.synrad.com/vseries/index.htm.

Synrad, Inc., Firestar V-Series 30 & 40W CO2 Lasers, 4 pages.

Synrad, Inc., 30 Watt CO2 Laser with Its Compact Size, Near-Perfect Beam Quality and Fast Rise Times, the Synrad v30 CO2 Laser Provides Users with the Ultimate Low Power CO2 Laser Tool, 1 page, www.synrad.com/vseries/v30.htm.

Synrad, Inc., Firestar OEM v30 Reference Guide, Version 3.2, Jun. 2012, 36 pages.

Synrad, Inc., Synrad's Firestar v40, 2 pages, www.synrad.com/vseries/v40.htm.

Synrad, Inc., Firestar v40 Version D Operator's Manual, Version 3.1, Sep. 2010, 106 pages.

* cited by examiner

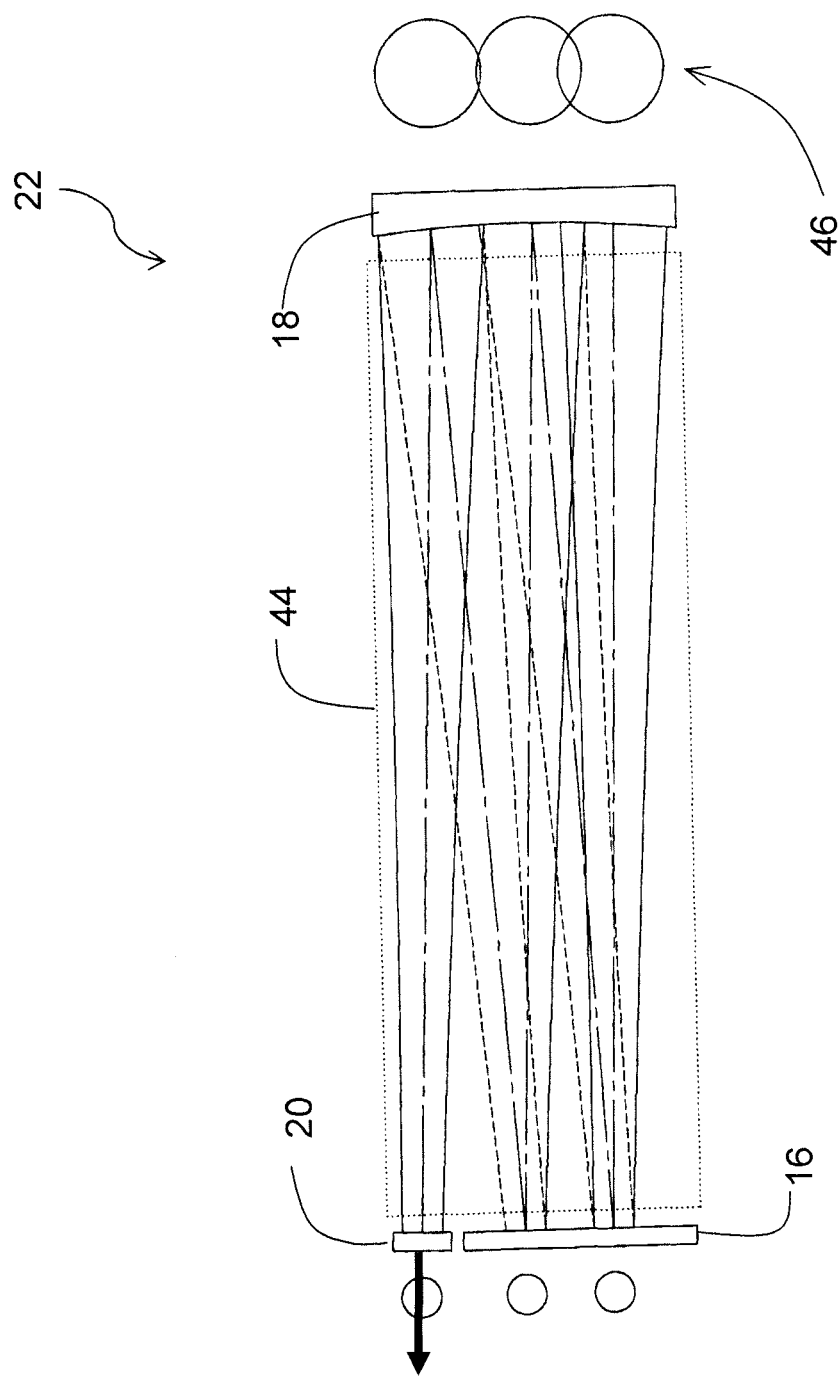

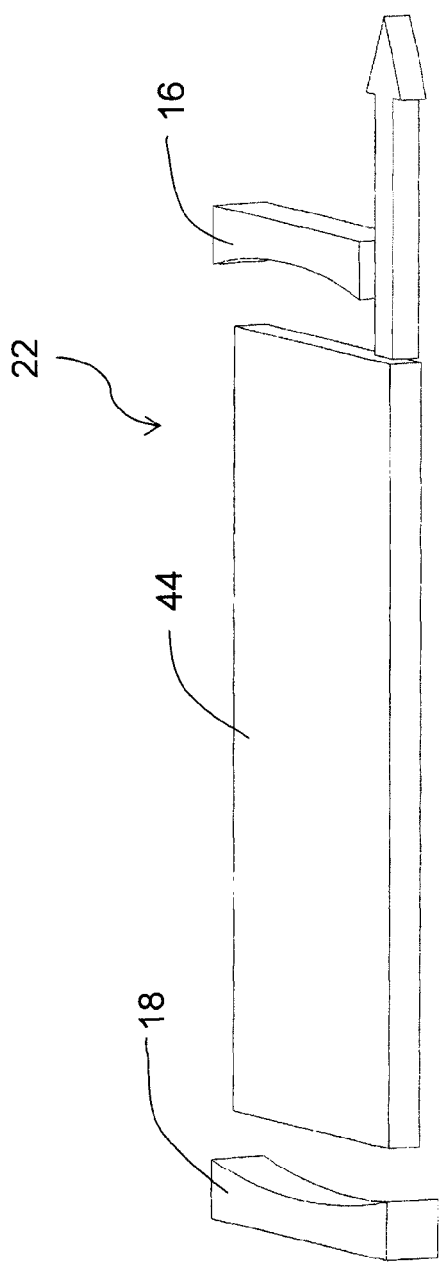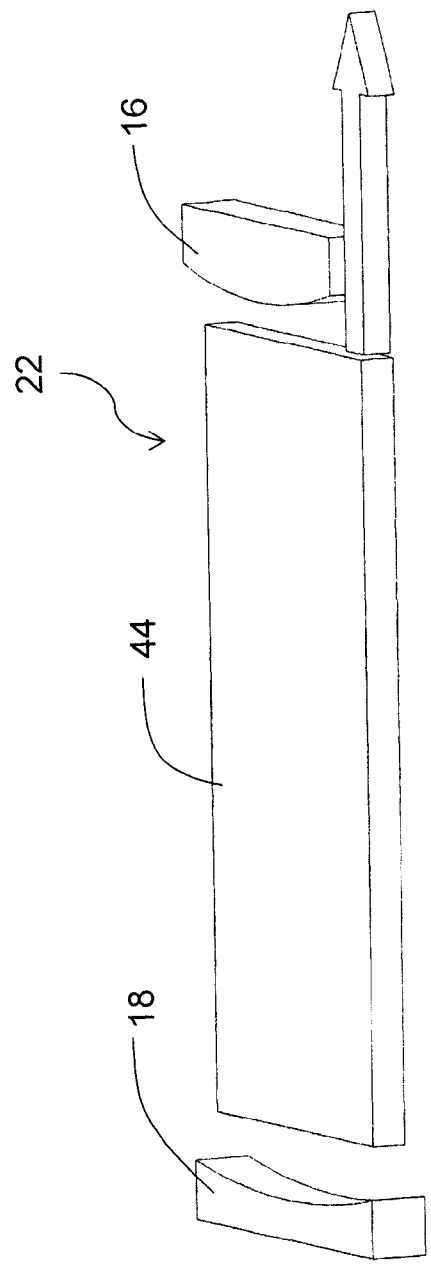

CERAMIC SLAB, FREE-SPACE AND WAVEGUIDE LASERS

FIELD OF THE INVENTION

The present invention relates generally to lasers and, more specifically, to monolithic, ceramic core, free-space slab and waveguide slab lasers.

BACKGROUND

Carbon dioxide ($CO_2$) lasers typically produce laser light in the infrared spectrum at around a 10.6 µm wavelength and are useful in many commercial, medical, and military applications (including, for example, engraving, cutting, etcetera). According to one conventional design for a carbon dioxide laser, aluminum electrodes that produce, confine, and cool the plasma formed between them are contained within a vacuum enclosure, also comprised of aluminum. Such a design requires the resonator coils to be inside the vacuum tight, gas-filled enclosure and is generally complicated by many parts. This design also necessitates one or more electrical feed-throughs to make connection to the electrodes and provide power to the plasma, while maintaining a vacuum seal. These feed-throughs present a weak point in the laser, as they tend to run hot due to the RF skin effect. Another known design for a carbon dioxide laser employs a ceramic bore which acts as an optical waveguide and/or a free space propagation path for the laser radiation and also confines the electrical discharge for exciting the carbon dioxide gas. In either instance, because the beam of light interacts to various degrees with the walls of the bore (depending on bore size), the shape and optical finish of the bore are critical to the performance of the laser. It becomes necessary to increase the gain length by folding the laser cavity into multiple serial beam paths to achieve higher power output, but the complexity of the ceramic grinding to accommodate these multiple paths and the number of mirrors required becomes problematic.

SUMMARY

The present invention may comprise one or more of the features recited in the attached claims and/or one or more of the following features and combinations thereof.

In one embodiment, a laser may comprise a ceramic body including a first wall and a second wall opposite the first wall, a first mirror positioned at first ends of the first and second walls, a second mirror positioned at second ends of the first and second walls opposite the first ends, the first and second walls and the first and second mirrors defining a slab laser cavity within the ceramic body. The laser may further comprise a first electrode positioned outside the laser cavity and adjacent to the first wall of the ceramic body and a second electrode positioned outside the laser cavity and adjacent to the second wall of the ceramic body, wherein a laser gas disposed in the laser cavity is excited when an excitation signal is applied to the first and second electrodes. In some embodiments, the first and second mirrors may form a free-space multi-folded resonator in the slab laser cavity. In other embodiments, the first and second mirrors may form a free-space unstable resonator in the slab laser cavity. In still other embodiments, the first and second mirrors may form a waveguide unstable resonator in the slab laser cavity.

The slab laser cavity may have a generally rectangular cross-section along a longitudinal axis extending between the first and second mirrors. A first transverse dimension of the slab laser cavity may be at least twice as large as a second transverse dimension of the slab laser cavity, the first transverse dimension being parallel to the first and second walls of the ceramic body and the second transverse dimension being perpendicular to the first and second walls of the ceramic body. The second transverse dimension of the slab laser cavity may be at least as large as a diameter of a fundamental mode of a free-space resonator formed by the first and second mirrors. Alternatively, the second transverse dimension of the slab laser cavity may function as a waveguide and may have a Fresnel number about less than or equal to about 0.3.

The ceramic body may comprise Alumina. At least one of the first and second mirrors may at least partially overlie a counter bore formed in the ceramic body. The first mirror may be supported by a first mirror mount coupled to the ceramic body, the second mirror may be supported by a second mirror mount coupled to the ceramic body, and the ceramic body and the first and second mirror mounts may form an airtight enclosure containing the laser gas.

The ceramic body may further includes a first gas reservoir formed therein, the first gas reservoir being in gas communication with the slab laser cavity via one or more gas communication slots extending therebetween. The one or more gas communication slots may be arranged along a side of the slab laser cavity that extends between the first and second walls of the ceramic body. The one or more gas communication slots may occupy at least half of the area of the side of the slab laser cavity. The ceramic body may further include a second gas reservoir formed therein, the second gas reservoir being in gas communication with the slab laser cavity via one or more gas communication slots extending therebetween. The first and second gas reservoirs may be positioned on opposite sides of the slab laser cavity.

The first electrode may be at least partially received in a first slot formed in an exterior surface of the ceramic body and the second electrode may be at least partially received in a second slot formed in an exterior surface of in the ceramic body. The first and second electrodes may be positioned such that portions of the laser gas adjacent to the first and second mirrors are not excited when the excitation signal is applied to the first and second electrodes.

The laser may further comprise a first heat sink thermally coupled to the first electrode. The first heat sink may be secured at a predetermined distance from the first electrode irrespective of a temperature of the ceramic body. The laser may further comprise a second heat sink thermally coupled to the second electrode and a spacer connecting the first and second heat sinks. The spacer may be formed of a material having a coefficient of thermal expansion that substantially matches both a coefficient of thermal expansion of the ceramic body and a coefficient of thermal expansion of the first and second electrodes.

The laser may further comprise an RF power circuit for energizing the first and second electrodes. The RF power circuit may include a plurality of resonant coils positioned adjacent to the ceramic body and electrically coupled in parallel between the first and second electrodes.

The first and second mirrors may form an unstable negative branch resonator. The first and second mirrors may form an unstable positive branch resonator. The first and second mirrors may form a stable resonator configured to have a beam overlap that does not exceed about 20%. At least one of the first and second mirrors may comprise a segmented mirror having a plurality of planar reflective surfaces oriented at distinct angles such that the beam overlap is about 0%.

In another embodiment, a laser may comprise an airtight dielectric enclosure containing a laser gas, the airtight dielectric enclosure defining a free-space slab laser cavity therein, a plurality of mirrors forming a stable multi-folded resonator in the free-space slab laser cavity, and a plurality of electrodes positioned outside the airtight dielectric enclosure such that the laser gas contained in the free-space slab laser cavity is excited when an excitation signal is applied to the plurality of electrodes.

In yet another embodiment, a laser may comprise an airtight dielectric enclosure containing a laser gas, the airtight dielectric enclosure defining a free-space slab laser cavity therein, a plurality of mirrors forming an unstable resonator in the free-space slab laser cavity, and a plurality of electrodes positioned outside the airtight dielectric enclosure such that the laser gas contained in the free-space slab laser cavity is excited when an excitation signal is applied to the plurality of electrodes. In some embodiments, the plurality of mirrors may form an unstable negative branch resonator. In other embodiments, the plurality of mirrors may form an unstable positive branch resonator.

In yet another embodiment, a laser may comprise an airtight dielectric enclosure containing a laser gas, the airtight dielectric enclosure defining a waveguide slab laser cavity therein, a plurality of mirrors forming an unstable resonator in the waveguide slab laser cavity, and a plurality of electrodes positioned outside the airtight dielectric enclosure such that the laser gas contained in the waveguide slab laser cavity is excited when an excitation signal is applied to the plurality of electrodes. In some embodiments, the plurality of mirrors may form an unstable negative branch resonator. In other embodiments, the plurality of mirrors may form an unstable positive branch resonator.

BRIEF DESCRIPTION OF THE DRAWINGS

FIG. 2 is a diagram of one illustrative embodiment of a free-space resonator that may be used with the laser of FIG. 1.

FIG. 3 is a diagram of one illustrative embodiment of a free-space or waveguide resonator that may be used with the laser of FIG. 1.

FIG. 4 is a diagram of another illustrative embodiment of a free-space or waveguide resonator that may be used with the laser of FIG. 1.

DESCRIPTION OF THE ILLUSTRATIVE EMBODIMENT

Figure 1:
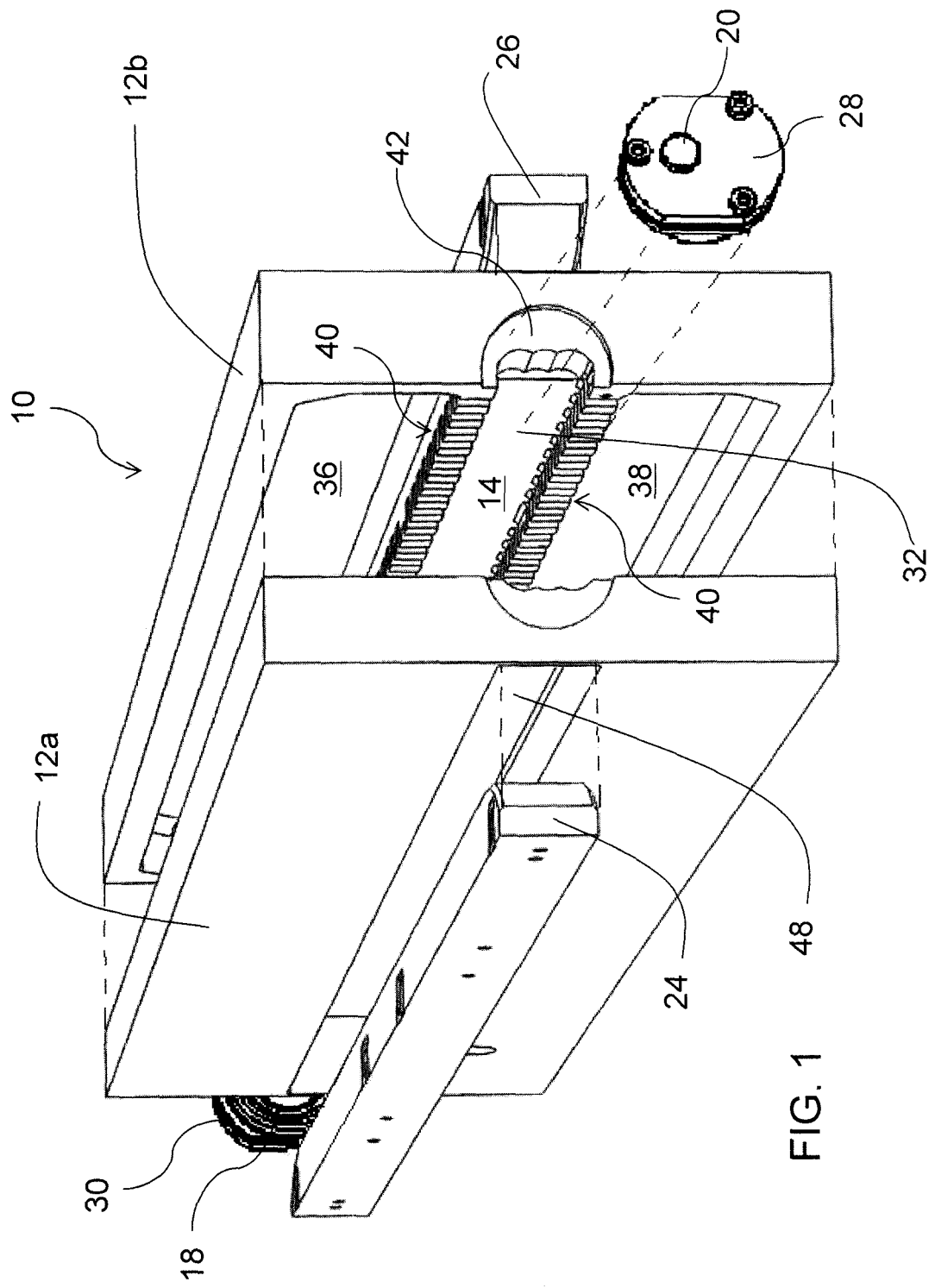
FIG. 1 is an exploded view of several components of a ceramic free-space multi-folded laser, according to one illustrative embodiment.

For the purposes of promoting an understanding of the principles of the invention, reference will now be made to an illustrative embodiment shown in the attached drawings and specific language will be used to describe the same.

One illustrative embodiment of a laser 10, according to the present disclosure, is shown in the diagrams of FIGS. 1 and 5-7. The laser 10 is illustratively embodied as a ceramic free-space multi-folded laser. Although a free-space multi-folded laser is shown in FIGS. 1 and 5-7 for purposes of illustration, the present disclosure also contemplates that the laser 10 being embodied as a ceramic free-space unstable laser or a ceramic waveguide unstable laser. The laser 10 generally includes a ceramic body 12 defining a slab laser cavity 14, a number of mirrors 16, 18, 20 forming a resonator 22 in the slab laser cavity 14, and a number of electrodes 24, 26 positioned outside the ceramic body 12 (and, hence, outside the slab laser cavity 14). According to the present disclosure, the slab laser cavity 14 may be either a free-space (i.e., non-waveguide) slab laser cavity or a waveguide slab laser cavity. Both a free-space slab laser cavity and a waveguide slab laser cavity may be understood with reference to the Fresnel number of the laser 10. The Fresnel number of a laser may generally be given by the formula: $N_F = a^2/(\lambda L)$, where a is half of the resonator aperture, $\lambda$ the wavelength of the laser beam, and L is the resonator length. A Fresnel number less than about 0.3 may generally define a true waveguide laser cavity. A Fresnel number greater than about 3 may generally define a free-space laser cavity in which there may be little or no interaction between the beam and the walls of the laser cavity. Fresnel numbers between about 0.3 and about 1.5 describe a quasi-free-space laser cavity of varying degrees of interaction between the beam and the walls of the laser cavity. According to the illustrative embodiment, the laser 10 may have a Fresnel number greater than about 1. In other embodiments, the laser 10 may have a Fresnel number less than about 0.3.

Referring now to FIG. 1, the illustrative embodiment of the laser 10 includes a ceramic body 12, a pair of electrodes 24, 26, and a pair of mirror mounts 28, 30. The ceramic body 12 of the laser 10 is illustratively embodied as being formed of two mirror image components: a left-side component 12a and a right-side component 12b. It will be appreciated that, in other embodiments, the ceramic body 12 may be formed as an integral component or may be comprised of three or more components. The ceramic body 12 and/or components 12a, 12b may also be non-symmetrical in some embodiments. In the illustrative embodiment, the ceramic body 12 comprises Alumina ($Al_2O_3$) with a purity between 95% and 99.9%. In other embodiments, the ceramic body 12 may be formed of Beryllium Oxide (BeO), Aluminium Nitride (AlN), certain types of glass and/or glass ceramics, or any material with similar electrical mechanical and thermal properties, or combinations thereof. It is also contemplated that the ceramic body 12 may be formed of other suitable dielectric materials (including non-ceramics).

In the illustrative embodiment, the interior of the ceramic body 12 defines a free-space slab laser cavity 14 having a generally rectangular cross-section. The slab laser cavity 14 is partially defined by two opposing walls 32 and by two opposing walls 34 of the ceramic body 12 (see FIG. 7). The opposing walls 34 may be mostly missing with only occasional supports or may include a larger number of supports (as shown in FIG. 1). In the illustrative embodiment, the dimension of the slab laser cavity 14 parallel to the walls 32 is more than double the dimension parallel the walls 34. In the illustrative embodiment, both dimensions (along walls 32 and along walls 34) are also at least as large as the diameter of the fundamental mode of the resonator 22, such that the walls 32, 34 do not substantially interfere with laser beams traveling through the slab laser cavity 14 (i.e., a free-space resonator). In the alternative embodiment of a waveguide resonator, the walls 32, 34 may be separated by about 1.4 times the intended beam width in the waveguide direction.

Figure 6:
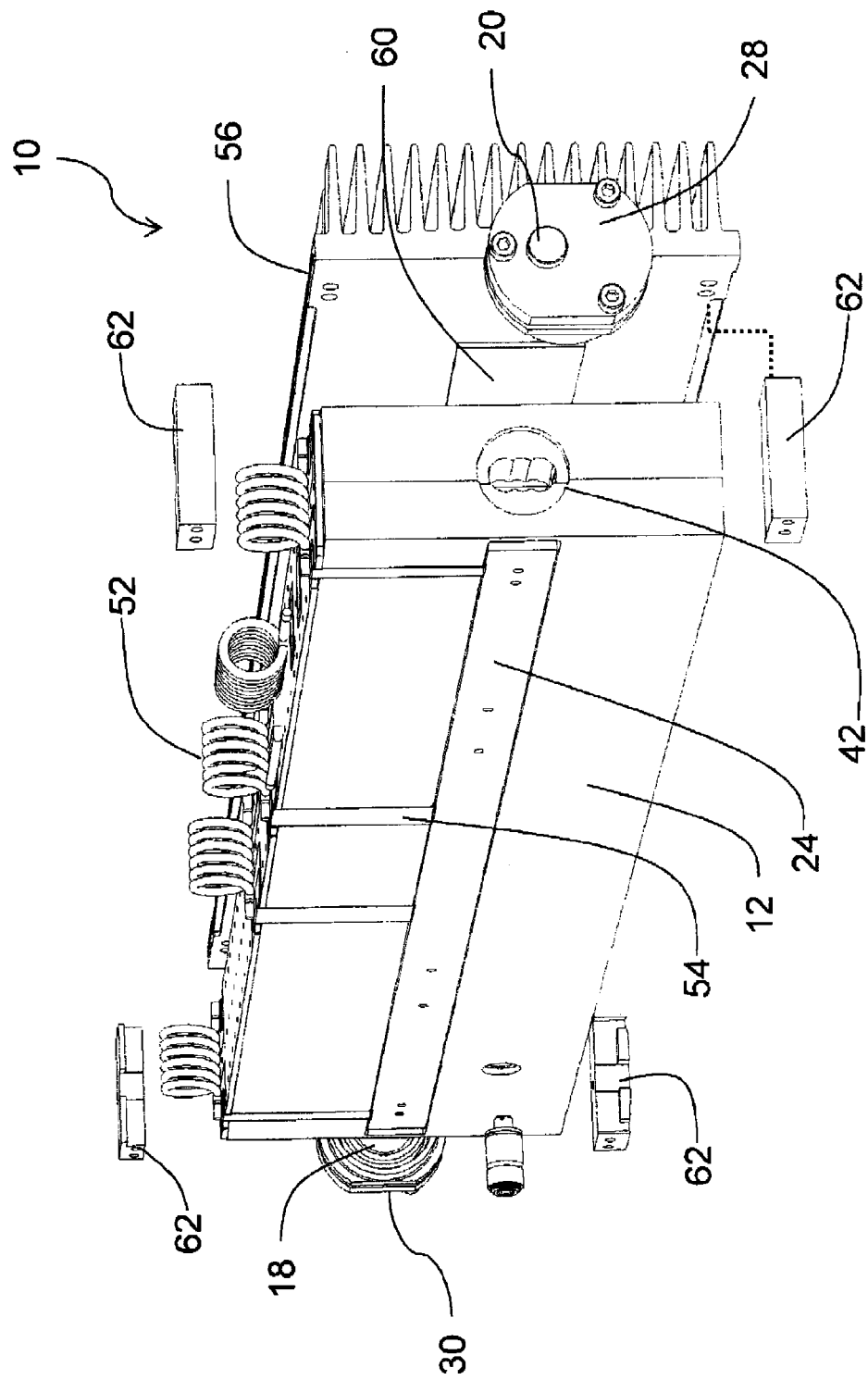
FIG. 6 is a partially exploded view of several components of the laser of FIG. 5.
Figure 7:
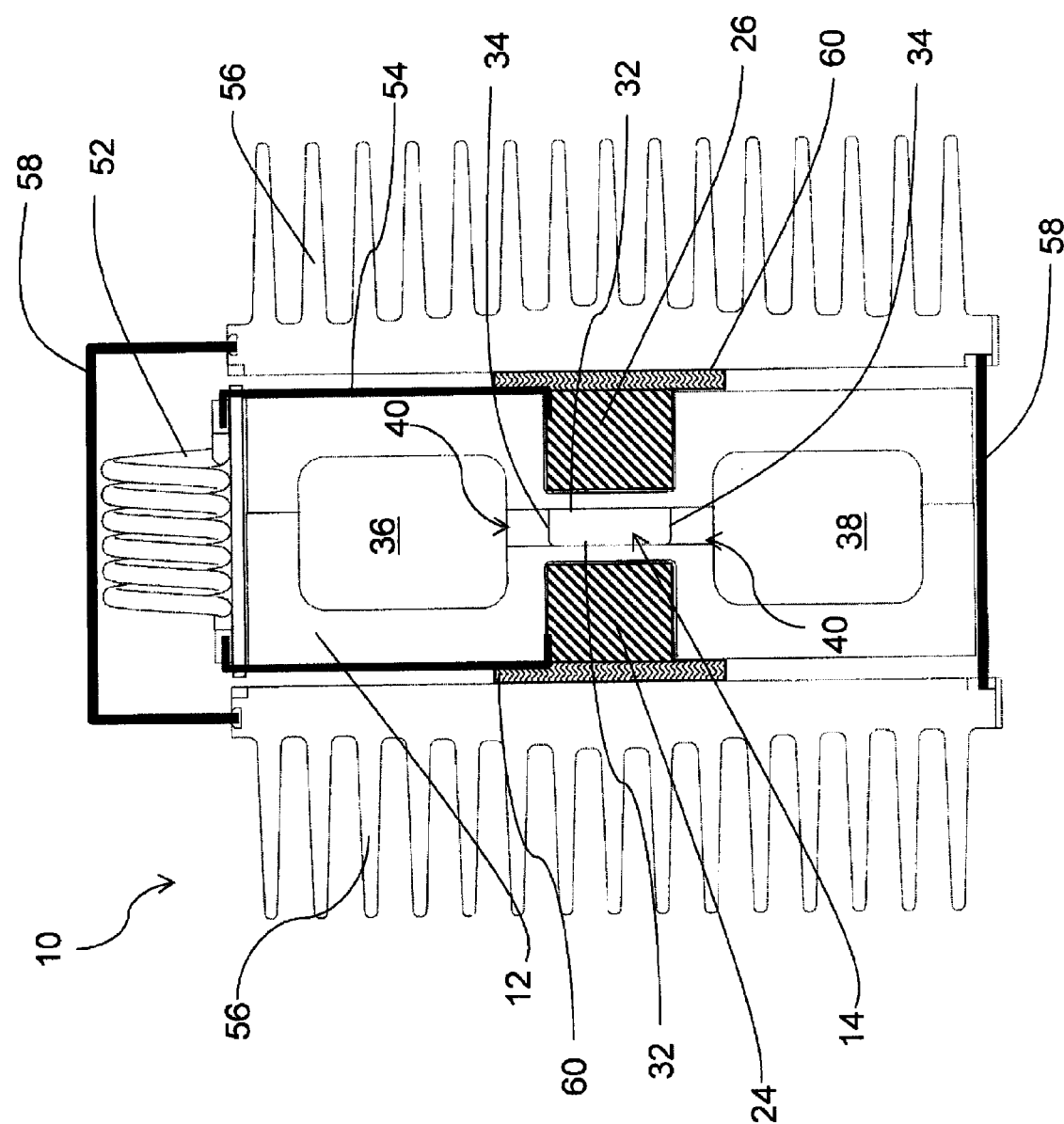
FIG. 7 is a cross-sectional view of several components of the laser of FIG. 5, taken along the line 7-7.

As can be seen in FIGS. 1 and 7, the interior of the ceramic body 12 is also formed to include a pair of gas reservoirs 36, 38. The gas reservoirs 36, 38 are in gas (i.e., fluid) communication with the slab laser cavity 14 via a number of gas communication slots 40, or open regions, formed in the opposing walls 34 of the ceramic body 12. The size and number of gas communication slots 40 formed in the opposing walls 34 may vary between only one larger slot 40 (i.e., a nearly open wall 34) to many smaller slots 40. In the illustrative embodiment, one of the gas reservoirs 36 is adjacent to one wall 34, while the other gas reservoir 38 is adjacent to the opposite wall 34. The ceramic body 12 may also be formed to include counter bores 42, as shown in FIGS. 1 and 6. The counter bores 42 are located at the ends of the slab laser cavity 14 and define a recessed edge entrance to the slab laser cavity 14 set back from the mirrors 16, 18, 20. This set back helps to filter out higher order mode structure. Since undesirable, rapidly diverging modes are skimmed on the recessed entrance edge of the counter bores 42, their chances of competing with the desired fundamental mode are lowered. In other embodiments, the counter bores 42 illustratively shown FIGS. 1 and 6 may take other forms, depending upon the type of resonator employed.

The illustrative embodiment of laser 10 also includes a number of mirrors 16, 18, 20. Two mirrors 16, 20 are supported by mirror mount 28, which is positioned at the front end of the slab laser cavity 14. The other mirror 18 is supported by mirror mount 30, which is positioned at the rear end of the slab laser cavity 14. The mirror mounts 28, 30 are sealed to the ceramic body 12 to form an airtight, or vacuum-sealed, enclosure. In the illustrative embodiment, the mirror mounts 28, 30 are coupled to the ceramic body using an epoxy. It will be appreciated that an airtight seal may also be provided by various other methods, including, but not limited to, brazing, welding, glass fritting, etcetera, and that the components 12a, 12b of the ceramic body 12 may be affixed to one another using similar methods. It is also contemplated that one or more of the mirrors 16, 18, 20 may be affixed directly to the ceramic body 12, without the use of a mirror mount. It will also be appreciated that the mirror 20 may be a window without a reflective surface in embodiments employing a free-space or waveguide unstable resonator.

The airtight enclosure formed by the ceramic body 12 and the mirror mounts 28, 30 is filled with a laser gas. The laser gas may be any mixture of gases (multiple elements and/or multiple molecules) sufficient to produce a gain medium in the slab laser cavity 14 when excited. In some embodiments, the gain may favor wavelengths other than those around 10.6 μm through the use of isotopes and may not be based upon $CO_2$, but another molecule (like CO, for example). In the illustrative embodiment, the ceramic body 12 is fully oxidized and, thus, will not react with the laser gas. In addition, as the ceramic body 12 has no internal parts, there are no virtual leaks formed by a close proximity between two surfaces (like those between a sandwich of an electrode and an insulator found in prior art lasers). With no surfaces in contact, there is no scrubbing between those surfaces as they heat and cool, causing gas contamination and deterioration issues. Furthermore, the Alumina body 12 of the illustrative embodiment allows coupling of RF power without the need for an RF feed-through. Finally, the ceramic body 12 can be cleaned to much higher standards than aluminum (providing greater laser life), and the Alumina core body can be fully recycled to like new condition (providing a product cost advantage in later years when units are retired and recycled back to the factory).

Together, the mirrors 16-20 of the illustrative embodiment form a free-space multi-folded resonator 22 in the slab laser cavity 14. A "multi-folded" resonator is one in which the laser beam travels back and forth between a plurality of mirrors (e.g., mirrors 16-20) over at least three distinct, but partially overlapping, pathways. The laser 10 of the illustrative embodiment employs a multi-folded, stable resonator 22 with five distinct laser beam pathways. A representation of this beam pattern within the gain medium 44 (i.e., the excited laser gas within the slab laser cavity 14) is shown in FIG. 2. In this embodiment of the resonator 22, the rear mirror 18 is spherically curved with spherical wavefront beam diameters and the front mirrors 16, 20 are flat with plano-wavefront beam diameters. The beam characteristics are determined by the final beam pathway formed between mirror 18 and output coupling mirror 20. The other four beams pathways, however, are all duplicates because each beam pathway is formed between a flat mirror 16 at one end and the same curved mirror 18 at the other. The overall spacing between the five beams pathways is primarily determined by the angle between mirror 16 and mirror 20. In the illustrative embodiment, this angle is set so that the beam overlap of reflections 46 does not exceed about 20%. The "beam overlap" may be defined as the amount of intersection between distinct laser beam pathways at one of the mirrors (e.g., the beam reflections 46 on the mirror 18 in FIG. 2), expressed as a percentage of beam diameter. A beam overlap greater than 20% may cause competition between the beam pathways and the mode may suffer. As shown in FIG. 2, each subsequent beam reflection 46 further from the first beam reflection hits the mirror 18 closer to the last beam reflection. In other words, the later beam reflections 46 become more overlapped on mirror 18 as the number of beam reflections increases. For this reason, the illustrative embodiment uses a five beam pathway configuration (with three reflections 46 on mirror 18) to avoid excess competition between beam pathways, which may result in a confused mode and poor power.

In other embodiments, the mirror 16 may be replaced by a diamond-turned segmented mirror having a plurality of planar reflective surfaces oriented at distinct angles. Such a segmented mirror 16 may redirect each beam pathway so as to space out the beam reflections 46 on mirror 18. Due to this better separation and the smaller diameter of spots on mirror 16, there is no beam overlap (i.e., the beam overlap is about 0%) and the last beam reflection at mirror 20 may easily be selected out. While preventing competition between the beams, however, the increasing number of beam reflections on mirrors 18, 20 may cause resulting reflection losses in the form of absorption. The segmented mirror geometry may allow more than five beams to be formed.

The resonator 22 may alternatively be embodied as a free-space unstable resonator 22, as shown in FIGS. 3 and 4. The resonators 22 of these illustrative embodiments are unstable in the axis of the slab width (i.e., the dimension along wall 32 of the ceramic body 12) and stable in the axis of slab thickness (i.e., the dimension along wall 34 of the ceramic body 12). In the unstable axis, beams tend to geometrically expand out across the resonator 22 until they are coupled out of the cavity across the edge of the mirror 16. In the stable axis, the beam propagates between mirror 16 and mirror 18 following normal Gaussian beam propagation laws. A "negative branch" configuration is shown in FIG. 3, in which both mirrors 16, 18 are concave in the unstable direction. A "positive branch" configuration is shown in FIG. 4, in which the mirror 16 is convex and the mirror 18 is concave. In both embodiments, the ratio of the radius of the two mirrors 16, 18 defines a ratio other than 1:1, so that some of the light is guaranteed to escape. This ratio is the equivalent to the output coupling percentage of the resonator 22. Both embodiments of the unstable resonator 22 employ mirrors 16, 18 with aspherical surfaces (i.e. the radius in one direction is different than the radius in the other, perpendicular direction).

In still other embodiments, the resonator 22 may alternatively be embodied as a waveguide unstable resonator 22, also as shown in FIGS. 3 and 4. The primary difference between free-space resonator embodiments and waveguide resonator embodiments is that, in the axis of slab thickness (i.e., the dimension parallel to the walls 34 of the ceramic body 12), the spacing between the walls 32 is much closer, allowing the resonating photons to be guided by the walls 32 of the slab laser cavity 14 in that direction. In the unstable axis, as in the free-space resonator embodiments, the beam is coupled out of the slab laser cavity 14 across the edge of the mirror 16. Embodiments of the laser 10 employing a waveguide unstable resonator 22 possess a gas cooling advantage over the free-space resonator embodiments because the cool waveguide walls 32 are much closer to the center of the plasma. The better heat removal and higher gain of such embodiments allow greater power extraction.

Returning now to FIG. 1, the laser 10 also includes a number of electrodes 24, 26 positioned outside the slab laser cavity 14 and adjacent to the walls 32 of the ceramic body 12. The laser gas disposed in the slab laser cavity 14 will be excited when an excitation signal is applied to the electrodes 24, 26. In the illustrative embodiment, the electrodes 24, 26 are each received in an elongated slot 48 formed in an exterior surface of the ceramic body 12. When an RF excitation signal is applied to the electrodes 24, 26, the laser gas in the slab laser cavity 14 is excited and, through capacitive coupling, produces a plasma gain medium 44. While the electrodes 24, 26 are shown as elongated electrodes in the illustrative embodiment, it is contemplated that the electrodes 24, 26 may have different geometrical forms, may be segmented, and may be flat or at an angle to the walls 32 of the ceramic body 12.

The use of electrodes 24, 26 that are external to the ceramic body 12 gives rise to many advantages. For instance, in the illustrative embodiment, RF energy is coupled into the slab laser cavity 14 through the walls 32 of the ceramic body 12, eliminating the need for feedthroughs and allowing heat to be coupled away more efficiently from the plasma. In other embodiments, electrodes of different geometrical forms may be used to excite only certain portions of the laser gas in the slab laser cavity 14. In other embodiments, single segments of multiple segment electrodes may be excited individually. Furthermore, the use of external electrodes 24, 26 allows for a continuous waveguide up to the surface of the mirrors 16, 18 without exciting the portion of laser gas directly adjacent to the mirrors 16, 18. It is well known that a gap between the end of the waveguide and the mirrors may introduce losses into the laser; the larger the gap, the higher the losses. On the other hand, a distance must be maintained between the excited plasma and the mirrors to avoid damage to mirror surfaces. Using external electrodes 24, 26 protects the mirrors 16, 18 from the plasma but still allows the ceramic body 12 to guide the laser radiation to the mirrors 16, 18 without any interruption in the waveguide surfaces.

Figure 5:
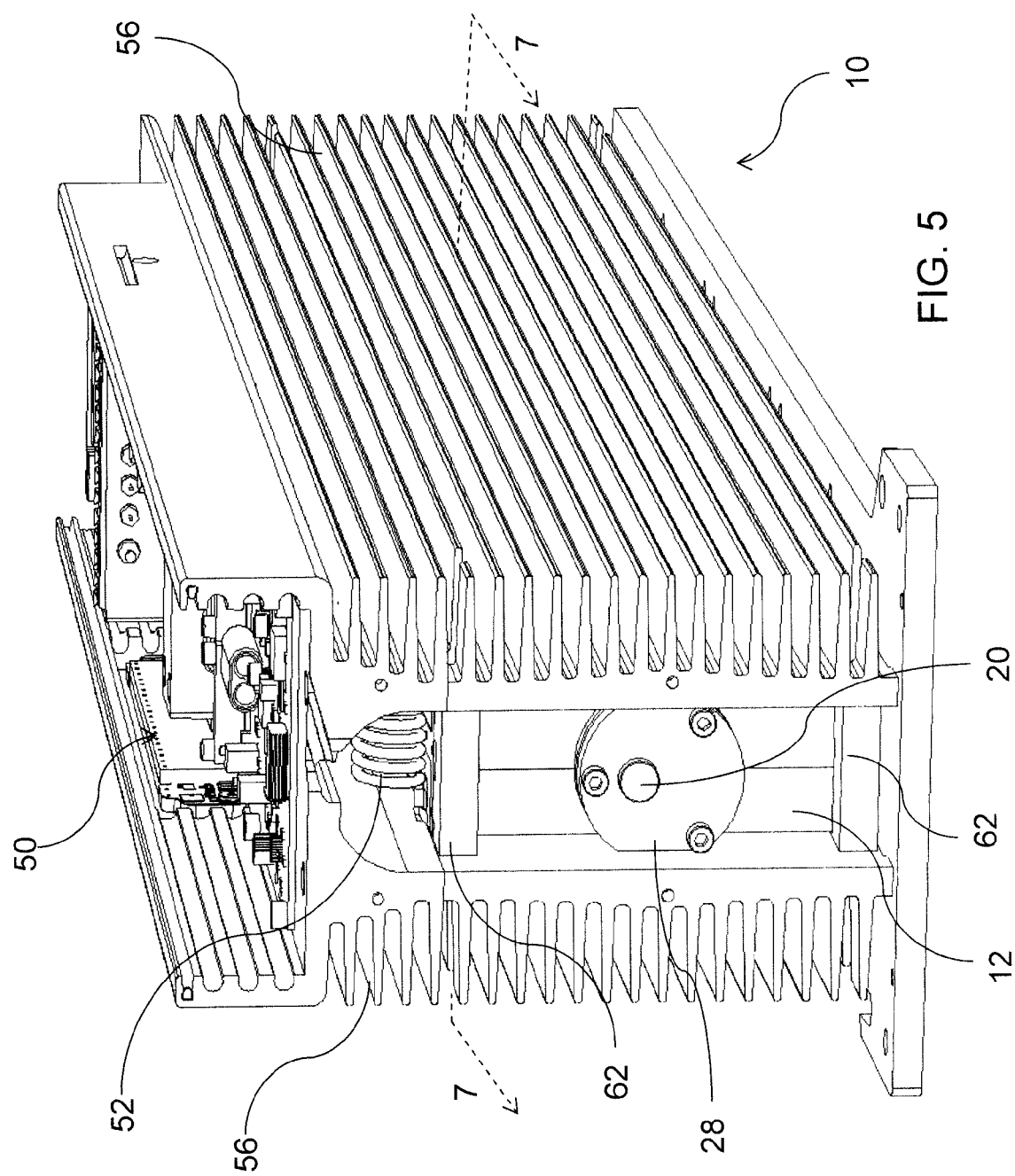
FIG. 5 is a schematic diagram of an assembled laser, according to one illustrative embodiment.

Referring generally now to FIGS. 5-7, the laser 10 also includes an RF power circuit for energizing the electrodes 24, 26. The RF power circuit includes a radio-frequency power amplifier (RFPA) 50 and a number of resonant coils 52, among other components. In the illustrative embodiment, the resonant coils 52 are positioned adjacent to the ceramic body 12 and electrically coupled in parallel between the electrodes 24, 26. The electrodes 24, 26 are electrically coupled to the coils 52 to provide an LC resonant circuit that is driven by the RFPA 50. Copper straps 54 are used to connect the electrodes 24, 26 to the resonant coils 52. These copper straps 54 make up some of the inductance of the circuit as well. The capacitance of the LC circuit is made up of both the capacitance between the two electrodes 24, 26 and the capacitance between each electrode 24, 26 and a corresponding heat sink 56 (described in more detail below). A cross-section of the electrical path between the coils 52 and electrodes 24, 26, including the heat sinks 56, is shown in FIG. 7. The gap between the electrodes 24, 26, including the slab laser cavity 14, results in a fairly low capacitance. In order to reduce the overall capacitance to which the resonant coils 52 are connected, the electrodes 24, 26 may be floating on both sides. The RFPA 50 may be connected to the laser resonant circuit in either a push-pull drive configuration or a single-sided drive configuration. As shown in FIG. 7, the two heat sinks 56 are electrically coupled to one another via plates 58 over their entire length in order to minimize the inductance of the heat sink portion of the LC circuit and to provide the best shielding possible. Since the circuit including the electrodes 24, 26 and resonant coils 52 is an emitter of RF energy, the heat sinks 56 and other enclosures of the laser 10 become shields and part of the RF circuit at the same time.

As mentioned above, the laser 10 may also include one or more thermal dissipation or thermal transfer devices 56 to prevent excess temperatures in the laser 10. For instance, water-cooled plates or water-cooled electrodes might be used in some embodiments. In the illustrative embodiment, the ceramic body 12 is generally sandwiched between two heat sinks 56. Each heat sink 56 is thermally coupled to one of the electrodes 24, 26 to pull heat from that electrode and, indirectly, from the slab laser cavity 14 in the ceramic body 12. Between the heat sink 56 and the respective electrode 24, 26, a thin material 60 is used to electrically insulate the electrode 24, 26 from the heat sink 56 and, at the same time, thermally conduct heat to the heat sink 56. In the illustrative embodiment, the thin material 60 is comprises a thick paste that is loaded with Alumina and cures to a soft rubber-like material. It is also contemplated that a thin ceramic strip could be used for the thin material 60. The thin material 60 may also be placed between the electrodes 24, 26 and the ceramic body 12 to fill any air gaps that might exist and promote thermal conduction. In any case, the material 60 will have a high dielectric constant (e.g., in the range of 8 or 9, where the Alumina body 12 has a dielectric constant of 10). The high dielectric constant of the material 60 causes the capacitance between one of the electrodes 24, 26 and the heatsink 56 to be much higher than the capacitance between the electrodes 24, 26.

To avoid uncontrolled tuning of the resonance beyond the best frequency match to the RFPA 50, the capacitance of the laser 10 should be kept constant. Since the capacitance between each electrode 24, 26 and heat sinks 56 pair is very sensitive to the spacing, the laser 10 is designed to maintain the heat sink 56 at a predetermined distance from the respective electrode 24, 26 irrespective of the temperature of the ceramic body 12 (over the range of operating temperatures for the laser 10). In the illustrative embodiment, the spacing between the two heat sinks 56 is maintained by spacers 62 that are made of a material that closely matches the coefficient of thermal expansion of both the ceramic body 12 and the electrodes 24, 26. These spacers 62 also support the ceramic body 12 and maintain the close spacing between the each electrode 24, 26 and the adjacent heat sink 56. The spacers 62 may be formed of several possible materials, including, but not limited to, Titanium or 7075-T6 Aluminum, depending upon the particular ceramic body 12 and electrodes 24, 26 being used. In other embodiments, the corners of the ceramic body 12 may be drilled through (in a way that avoids the gas reservoirs 36, 38) to allow threaded inserts to be installed. In these embodiments, the ceramic body 12 itself becomes the spacer 62 as it expands and contracts with changing temperature.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A laser comprising:
a ceramic body including a first wall and a second wall opposite the first wall,
a first mirror positioned at first ends of the first and second walls,
a second mirror positioned at second ends of the first and second walls opposite the first ends of the first and second walls, the first and second walls and the first and second mirrors defining a slab laser cavity within the ceramic body,
a first electrode positioned outside the slab laser cavity and adjacent to the first wall of the ceramic body,
a first heat sink thermally coupled to the first electrode, the first heat sink being positioned adjacent the first electrode with a first electrically insulating material disposed between the first heat sink and the first electrode,
a second electrode positioned outside the slab laser cavity and adjacent to the second wall of the ceramic body, a second heat sink thermally coupled to the second electrode, the second heat sink being positioned adjacent the second electrode with a second electrically insulating material disposed between the second heat sink and the second electrode, and an RF power circuit configured to excite a laser gas disposed in the slab laser cavity by applying an excitation signal to the first and second electrodes, wherein the first electrode, the first electrically insulating material, and the first heat sink function as a first capacitor of the RF power circuit and the second electrode, the second electrically insulating material, and the second heat sink function as a second capacitor of the RF power circuit.

2. The laser of claim 1 wherein the first and second mirrors form a free-space multi-folded resonator in the slab laser cavity.

3. The laser of claim 1 wherein the first and second mirrors form a free-space unstable resonator in the slab laser cavity.

4. The laser of claim 1 wherein the first and second mirrors form a waveguide unstable resonator in the slab laser cavity.

5. The laser of claim 1 wherein the slab laser cavity has a generally rectangular cross-section along a longitudinal axis extending between the first and second mirrors.

6. The laser of claim 5 wherein a first transverse dimension of the slab laser cavity is at least twice as large as a second transverse dimension of the slab laser cavity, the first transverse dimension being parallel to the first and second walls of the ceramic body and the second transverse dimension being perpendicular to the first and second walls of the ceramic body.

7. The laser of claim 6 wherein the second transverse dimension of the slab laser cavity is at least as large as a diameter of a fundamental mode of a free-space resonator formed by the first and second mirrors.

8. The laser of claim 6 wherein the second transverse dimension of the slab laser cavity functions as a waveguide and has a Fresnel number about less than or equal to about 0.3.

9. The laser of claim 1 wherein the ceramic body comprises Alumina.

10. The laser of claim 1 wherein at least one of the first and second mirrors at least partially overlies a counter bore formed in the ceramic body.

11. The laser of claim 1 wherein:
the first mirror is supported by a first mirror mount coupled to the ceramic body,
the second mirror is supported by a second mirror mount coupled to the ceramic body, and
the ceramic body and the first and second mirror mounts form an airtight enclosure containing the laser gas.

12. The laser of claim 1 wherein the ceramic body further includes a first gas reservoir formed therein, the first gas reservoir being in gas communication with the slab laser cavity via one or more gas communication slots extending therebetween.

13. The laser of claim 12 wherein the one or more gas communication slots are arranged along a side of the slab laser cavity that extends between the first and second walls of the ceramic body.

14. The laser of claim 13 wherein the one or more gas communication slots occupy at least half of the area of the side of the slab laser cavity.

15. The laser of claim 12 wherein the ceramic body further includes a second gas reservoir formed therein, the second gas reservoir being in gas communication with the slab laser cavity via one or more gas communication slots extending therebetween, the first and second gas reservoirs being positioned on opposite sides of the slab laser cavity.

16. The laser of claim 1 wherein the first electrode is at least partially received in a first slot formed in an exterior surface of the ceramic body and the second electrode is at least partially received in a second slot formed in an exterior surface of in the ceramic body.

17. The laser of claim 1 wherein the first and second electrodes are positioned such that portions of the laser gas adjacent to the first and second mirrors are not excited when the RF power circuit applies the excitation signal to the first and second electrodes.

18. The laser of claim 1 wherein the first heat sink is secured at a predetermined distance from the first electrode irrespective of a temperature of the ceramic body and the second heat sink is secured at a predetermined distance from the second electrode irrespective of the temperature of the ceramic body.

19. The laser of claim 18 further comprising a spacer connecting the first and second heat sinks, the spacer being formed of a material having a coefficient of thermal expansion that substantially matches both a coefficient of thermal expansion of the ceramic body and a coefficient of thermal expansion of the first and second electrodes.

20. The laser of claim 1 wherein the RF power circuit further comprises a plurality of resonant coils positioned adjacent to the ceramic body and electrically coupled in parallel between the first and second electrodes.

21. The laser of claim 1 wherein the first and second mirrors form an unstable negative branch resonator.

22. The laser of claim 1 wherein the first and second mirrors form an unstable positive branch resonator.

23. The laser of claim 1 wherein the first and second mirrors form a stable resonator configured to have a beam overlap that does not exceed about 20%.

24. The laser of claim 23 wherein at least one of the first and second mirrors comprises a segmented mirror having a plurality of planar reflective surfaces oriented at distinct angles such that the beam overlap is about 0%.

25. A laser comprising:
- an airtight dielectric enclosure containing a laser gas, the airtight dielectric enclosure defining a free-space slab laser cavity therein,
- a plurality of mirrors forming an unstable resonator in the free-space slab laser cavity,
- a plurality of electrodes positioned outside the airtight dielectric enclosure such that the laser gas contained in the free-space slab laser cavity is excited when an excitation signal is applied to the plurality of electrodes,
- a plurality of heat sinks, each of the plurality of heat sinks being positioned adjacent one of the plurality of electrodes with a thin dielectric material disposed therebetween, and
- an RF power circuit configured to apply the excitation signal to the plurality of electrodes, the RF power circuit comprising first and second capacitors, the first and second capacitors each comprising one of the plurality of heat sinks, one of the plurality of electrodes, and the thin dielectric material disposed therebetween.

26. The laser of claim 25 wherein the plurality of mirrors form an unstable negative branch resonator.

27. The laser of claim 25 wherein the plurality of mirrors form an unstable positive branch resonator.

28. A laser comprising:
- an airtight dielectric enclosure containing a laser gas, the airtight dielectric enclosure defining a waveguide slab laser cavity therein,
- a plurality of mirrors forming an unstable resonator in the waveguide slab laser cavity,
- a plurality of electrodes positioned outside the airtight dielectric enclosure such that the laser gas contained in the waveguide slab laser cavity is excited when an excitation signal is applied to the plurality of electrodes,
- a plurality of heat sinks, each of the plurality of heat sinks being positioned adjacent one of the plurality of electrodes with a thin dielectric material disposed therebetween, and
- an RF power circuit configured to apply the excitation signal to the plurality of electrodes, the RF power circuit comprising first and second capacitors, the first and second capacitors each comprising one of the plurality of heat sinks, one of the plurality of electrodes, and the thin dielectric material disposed therebetween.

29. The laser of claim 28 wherein the plurality of mirrors form an unstable negative branch resonator.

30. The laser of claim 28 wherein the plurality of mirrors form an unstable positive branch resonator.

31. The laser of claim 1 wherein the ceramic body comprises glass.

32. The laser of claim 1 wherein the first and second electrically insulating materials each comprise a thin ceramic strip.

33. The laser of claim 1 wherein the first and second electrically insulating materials each comprise a thermally conductive paste that cures to a rubber-like material, the thermally conductive paste comprising a dielectric material.

34. The laser of claim 1 wherein the first and second electrodes are positioned such that portions of the laser gas adjacent to one or more sides of the slab laser cavity extending between the first and second walls of the ceramic body are not excited when the RF power circuit applies the excitation signal to the first and second electrodes.

* * * * *